United States Patent Office 3,494,308
Patented Feb. 10, 1970

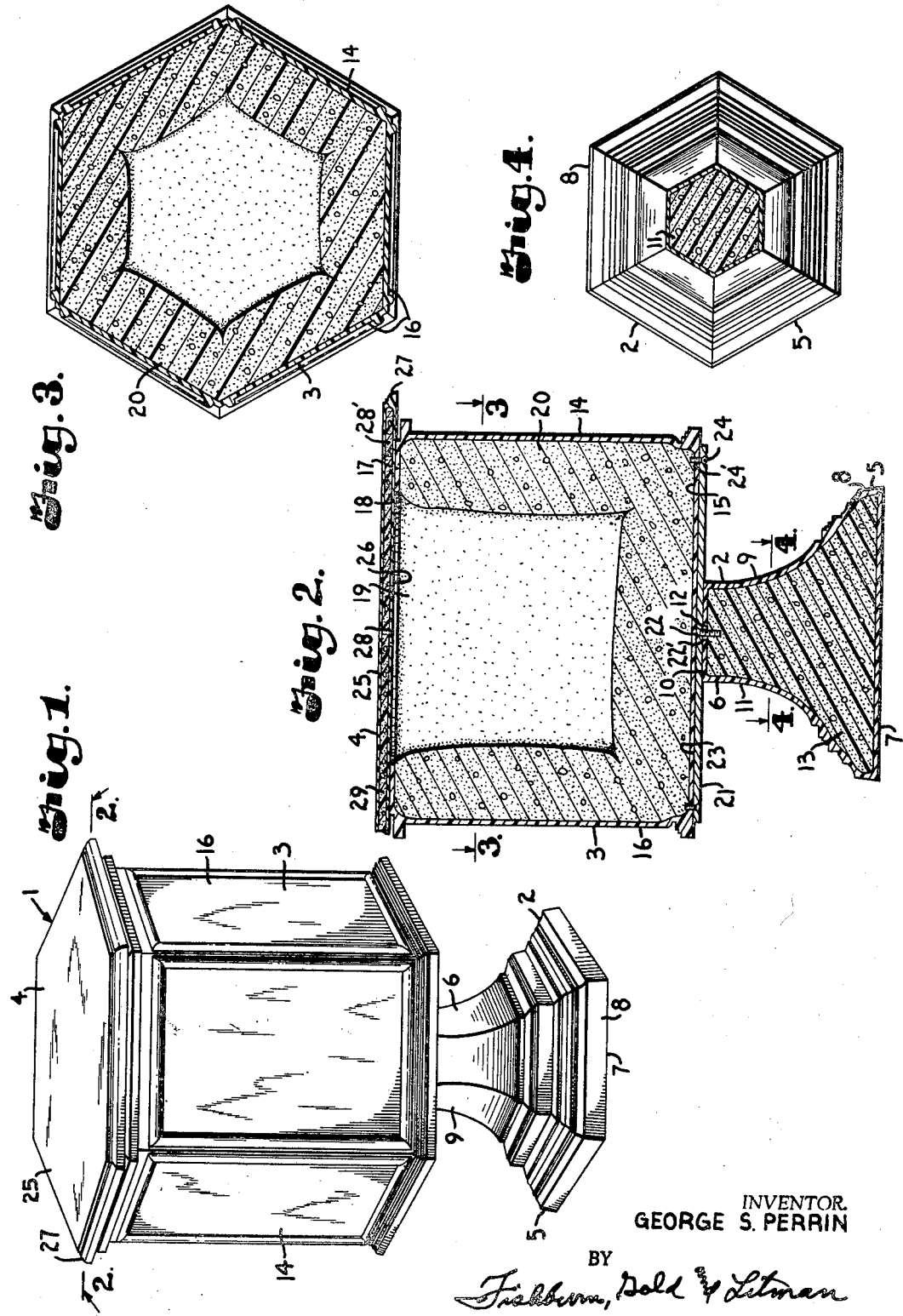
Feb. 10, 1970     G. S. PERRIN     3,494,308
COMPOSITE ARTICLE HAVING PORTIONS SIMULATING WOOD
Filed Nov. 14, 1967     2 Sheets-Sheet 1
INVENTOR.
GEORGE S. PERRIN
BY
ATTORNEYS

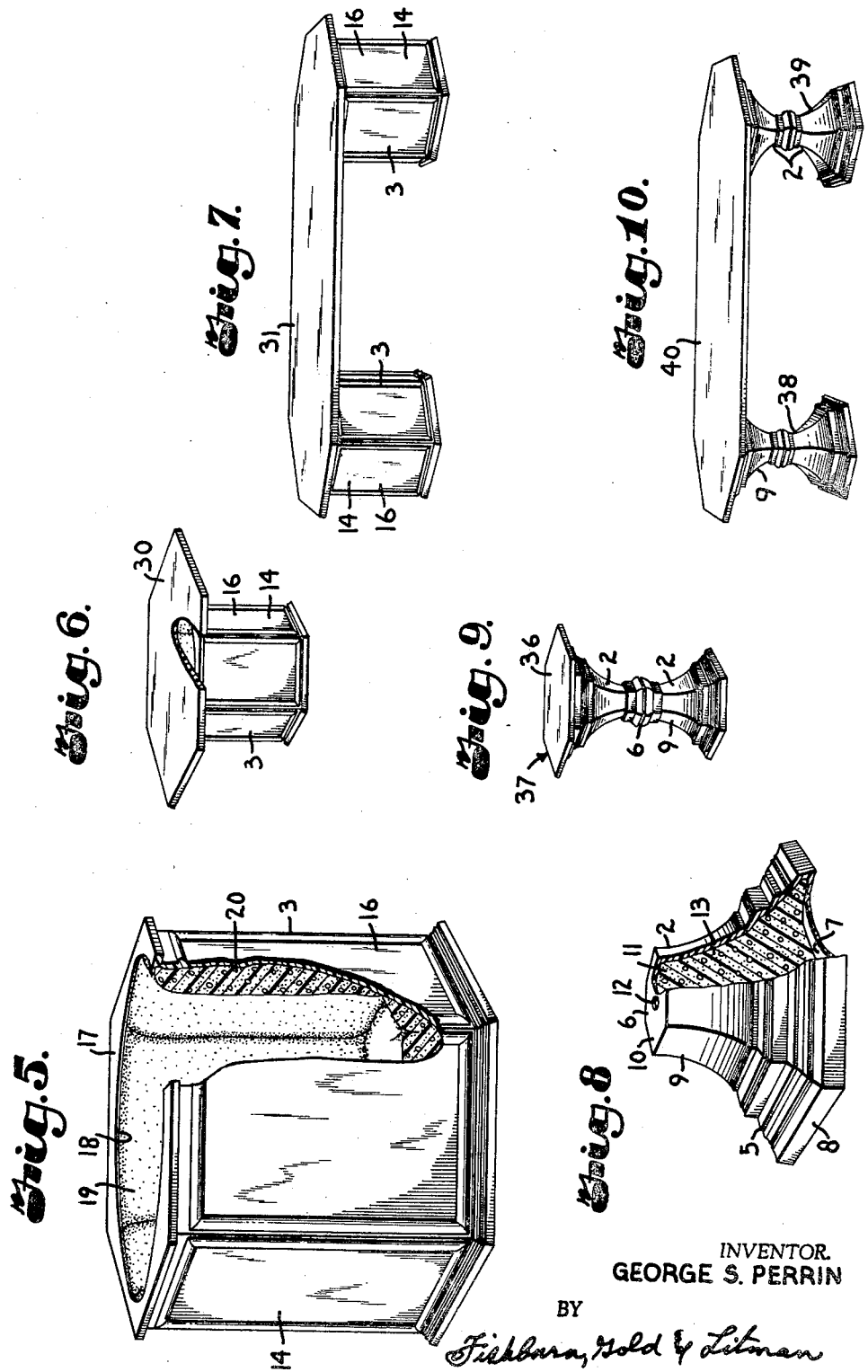

3,494,308
COMPOSITE ARTICLE HAVING PORTIONS SIMULATING WOOD
George S. Perrin, 3008 S. Dallas Drive,
Fort Smith, Ark. 72901
Filed Nov. 14, 1967, Ser. No. 683,398
Int. Cl. A47b 13/02, 97/00, 17/04
U.S. Cl. 108—150                                         4 Claims

ABSTRACT OF THE DISCLOSURE

A composite article such as furniture items, tables or the like, with a portion having a hollow body of synthetic resin with thin walls having an exterior surface of a wood simulating appearance. A substantial quantity of rigid foam resin adhered to the inner surfaces of the walls providing strength, weight, and a solid sound of wood. The article has a top structure adhered to said body member. A combination of hollow molded synthetic resin members with rigid resin foam inside the body thereof and reinforcing the walls, the members being such that they may be combined to form a plurality of different tables and the like.

---

This invention relates to a composite structure and method of making same from thin walled members and particularly with members of synthetic resin wherein the final product has the same weight and feel as solid wood but with the added features of strength and durability and it won't crack, swell or stain. Heretofore there have been attempts to make furniture and other items of molded synthetic resins but in making same of thin walled structures, the final item had a hollow sound and impacts against the walls could cause cracking or other damage. In efforts to eliminate these disadvantages by making the walls thick or the item solid resulted in prohibitive costs, excessive weight as well as difficulties in manufacture and curing.

The principal objects of the present invention is to provide composite members with an appearance, weight and feel of wood for making furniture pieces and the like; to provide wood simulating members of thin wall structure internally re-inforced with rigid synthetic resin foam; to provide members for use in furniture pieces and the like wherein said membes are particularly adapted for rotary molding with an opening for introduction of such foam into the interior thereof for adherence to the walls; to provide a process of manufacturing furniture pieces wherein two molded members may be variously combined with tops added to form a relatively large number of different furniture pieces or tables; and to provide a composite structure and method of making same in which the portions are easily and inexpensively made by molding from plastic material, applying and curing foam therein, which members are easily assembled into attractive furniture items such as tables and the like.

Other objects and advantages of this invention will become apparent from the following description taken in connection with the accompanying drawings wherein are set forth by way of illustration and example certain embodiments of this invention.

FIG. 1 is a perspective view of a composite article embodying the features of the present invention in the form of a lamp table.

FIG. 2 is a vertical section through the article taken on the line 2—2, FIG. 1.

FIG. 3 is a horizontal sectional view through the article taken on the line 3—3, FIG. 2.

FIG. 4 is a horizontal sectional view through the article taken on the line 4—4, FIG. 2.

FIG. 5 is a persepective view of a drum unit with portions broken away to illustrate the structure thereof.

FIG. 6 is a perspective view of a drum bunch table with portions broken away to illustrate the structure thereof.

FIG. 7 is a perspective view of a double drum table.

FIG. 8 is a perspective view of a pedestal member with portions broken away to illustrate the structure thereof.

FIG. 9 is a perspective view of a pedestal table with portions broken away to illustrate the structure thereof.

FIG. 10 is a perspective view of a double pedestal table.

Referring more in detail to the drawings:

The reference numeral 1 generally designates a composite article which is illustrated in the form of a table of the type commonly referred to as commode or lamp tables. In the structure illustrated in FIGS. 1 to 4, inclusive, the table includes a lower or base unit 2 and an upper or drum unit 3 and a cover or table top 4, all of which are secured together, as later described.

The lower or base unit 2 and the drum unit 3 are formed in substantially the same manner as by molding of synthetic resin to provide a body member having a relatively thin wall with a rigid synthetic foam applied to the interior to provide weight, a solid sound and to re-inforce the thin walls. The lower or base unit 2 is illustrated as being of a tapered or flared construction, and it is preferably molded as by rotary molding to provide a body with a large diameter or transverse dimensioned end 5 and a small end 6, the end 5 having a wall 7 with a peripheral upstanding wall 8 which blends into a generally upwardly and inwardly sloping or curved wall 9 that terminates at the small end wall 10. These walls define a hollow body or shell in which the walls are all integral and in the illustrated structure, access to the interior 11 is through a small opening 12 in the end wall 10. It is preferred that the walls of the shell be molded of a high impact synthetic resin, as for example, a high impact styrene or other suitable substantially rigid high impact resin. Polyethylene, polypropylene, nylon and the like are also suitable.

In making the lower or base member 2 the shell is molded and then if desired the mold may be opened and a synthetic resin foam introduced into the opening 12 to fill the interior with the expandable resin or foam such as styrene or other suitable resin foam filling 13 and the mold closed for curing of the resin foam. If desired, for production scheduling, the shell may be molded, cured, and then removed from the mold thereafter. At a convenient time the resin foam is introduced into the interior in the quantity desired, which in the member 2 is illustrated as filling same, and then the structure subjected to suitable conditions for curing of the foam into a rigid foam that adheres to the interior of the shell walls, reinforces same, and provides a solid sound.

Drum member 3 is also of a structure having a hollow body or shell 14 which in the illustrated structure has a bottom wall 15, upwardly extending side walls 16 terminating in an inwardly extending top flange or wall 17 which terminates as at 18 to provide an opening 19 for access to the interior of the shell. The drum member also is preferably of the same resin as the base member body, for example, the high impact plastic styrene or other suitable resin, and it is preferably molded in a thin wall structure by rotary molding or the like. The drum has a liner or filler 20 formed of a rigid synthetic resin foam such as a styrene or other suitable rigid resin foam that adheres to all of the inside surfaces of the walls of the drum. It is preferably of substantial thickness, as for example, one or more inches thick and preferably in the nature of two to three inches in thickness to provide substantial body and providing a solid sound to the structure. The drum member may also be molded as described relative to the base member and the mold opened for application of the expandable resin or foam to the interior walls of the shell and the mold then closed and the foam cured. The shell can be removed from the mold and later the expandable resin or foam maybe applied and cured when desired.

The mold surfaces may be of any shape to provide the desired outside appearance of the article and it is preferably foamed in the manner whereby the outer surfaces of the shell have lines and contours simulating wood. The surface contours maybe such that the articles are multiple sided, circular or the like. Also, the contours may be of a stepped design, panel like, or other shape and design as is or could be made from wood. The wood color, as desired, is applied as by spraying suitable coloring material, stain or the like, to said exterior surfaces whereby they have the appearance of a desired type of wood.

With the base and drum member made and finished as described, the table structure is then assembled by applying a flat sheet or board 21 to the end 6 of the base member, said sheet may be of press board, rigid plastic or other suitable material, with an outer peripheral dimension less than the transverse dimension of the drum. The sheet or board 21 is applied, centered, and secured to the base member by suitable adhesive and also by fastening devices such as flat head screws 22 or the like extending through holes 22' in the board and threaded into the wall 10. Then, the drum is centered on the base member with the bottom wall 15 resting on the upper surface 23 of the board or sheet 21 and is then secured thereto by suitable adhesive and suitable fastening devices such as screws 24 extending through holes 24' in the board and threaded into the wall 15.

It is to be understood that the structural portions may be of a double thin wall structure with the rigid foam filling the space therebetween. In the form of the invention illustrated in FIGS. 1 to 4, inclusive, the table top 4 may be of any suitable material such as a slab of marble, slate, either natural or synthetic, however, in the structure illustrated, the table top is in the form of a wood imulating member having flat substantially parallel top and bottom walls 25 and 26, respectively, connected by integral peripheral wall 27 forming a hollow body or shell. The bottom wall 26 preferably has an opening 28 providing access to the interior 28'. The top 4 is preferably molded as by rotary molding and the interior filled with a rigid synthetic resin foam 29 which is applied and cured in the manner described relative to the base member and drum members. The table top may be positioned on the flange or wall 17 of the drum and merely rest thereon, however, it is preferred that it be centered and secured in place by a suitable resin adhering the contacting portions of the wall 17 and the bottom wall 26 of the table top to complete the table structure and form an attractive furniture piece that has the appearance, weight and feel of solid wood.

The drum unit member 3 is manufactured as a composite structure of the shell with filler or liner foam 20 forming a unit as illustrated in FIG. 5. This structure may be used alone or in combinations to produce different furniture pieces. In the structure illustrated in FIG. 6, the bottom wall 15 forms the bottom of the structure adapted to rest on a supporting surface and a table top 30 is applied thereto and preferably secured to the top 17 of the drum by suitable adhesive. In the form of table illustrated in FIG. 6 the table top 30 is in the form of a solid slab such as a synthetic slate or the like. It is to be understood that the table top may be only slightly larger than the transverse drum dimensions or it may be substantially larger as illustrated in FIG. 6 to form a cocktail table. The drums 3 may be combined in pairs to support an elongate table top 31 as illustrated in FIG. 7, the top 31 being secured to both drum top wall 17 by adhesive.

The base member 2, constructed as described, is manufactured as a unitary member as illustrated in FIG. 8, and may be combined with the drum as illustrated in FIGS. 1 to 4, inclusive, or may be combined in pairs wherein one member 2 is inverted over the other, as illustrated in FIG. 9 to form a pedestal 35. In this structure the members 2 are identical and the smaller ends 6 are engaged, the units aligned and the contacting surfaces of the walls 10 secured together by suitable adhesive. A suitable table top 36 is applied to and secured as by adhesive to the wall 7 of the inverted or uppermost unit to form a pedestal table 37. These units are also adapted for use in such a stacked arrangement whereby a pair of the stacked units forming a pedestal such as 38 and 39 have an elongate table top 40 adhered thereto by adhesive or the like whereby the ends of the table top 40 are supported by the pedestals.

The various combinations illustrated in the drawings are exemplary only. There can be various combinations of the drum and pedestal units and also the exterior surfaces can be varied to provide different shapes and designs. Also, the type of structure illustrated and described is adaptable for various types of articles, particularly in articles in which a wood appearance is desired. Also, the invention is adaptable to produce structures with substantial strength and durability and solid sound with a relatively small quantity of synthetic resins.

What I claim and desire to secure by Letters Patent is:

1. A plastic article of manufacture having the appearance of wood and a solid sound comprising:
    (a) a plurality of integral thin walls of synthetic resin defining a hollow body, said walls having outward surfaces with substantially planar portions,
    (b) the planar portions of the outer surfaces of said thin walls having lines and contours substantially corresponding to wood surfaces,
    (c) a cured in place rigid synthetic foam of one to three inches thickness covering and adhered to inner surfaces of said thin walls forming a complete lining therefor to provide support for said thin walls and reduce the resonance thereof.

2. An article of furniture comprising,
    (a) a hollow body unit with thin walls forming a shell of synthetic resin, said walls having exterior surfaces with lines and contours substantially corresponding to a wood surface and simulating the appearance of same,
    (b) said shell walls including a bottom with integral upwardly extending side walls terminating in inwardly extending flanges surrounding an opening to the hollow interior,
    (c) a cured in place rigid synthetic resin foam covering and adhered to inner surfaces of said thin walls completely lining same to provide support for said thin walls and reduce the resonance thereof.

3. An article of furniture as set forth in claim 2 and including,
    (a) a top member superimposed upon said body and secured to said flange closing the opening to the interior of the body suit.

4. An article of furniture as set forth in claim 3 and including,
    (a) a second hollow body unit having a large transverse dimensioned upper end, said second hollow body unit having thin walls forming a shell of synthetic resin with said walls having exterior surfaces with lines and contours substantially corresponding to a wood surface and simulating the appearance of same, the wall at the small diameter end having an opening to the hollow interior,
    (b) a cured in place rigid synthetic resin foam filling the interior of the second body unit and adhered to the walls thereof to provide support for said walls and reduce the resonance thereof, (c) a flat rigid sheet secured to the small end of the second body unit and having portions extending outwardly therefrom,
(d) said first body unit being mounted on the rigid sheet in superimposed relation,
(e) means securing the rigid sheet to the bottom wall of the first body unit.

References Cited

UNITED STATES PATENTS

| | | | |
|---|---|---|---|
| 2,548,927 | 4/1951 | Anderson | 108—150 X |
| 3,088,133 | 5/1963 | Waxman | 5—361 |
| 3,091,497 | 5/1963 | Houser | 297—450 |
| 3,126,229 | 3/1964 | Dickerson | 297—455 |
| 3,222,698 | 12/1965 | Levinson | 5—361 |
| 3,230,909 | 1/1966 | Watson | 108—150 |
| 3,230,910 | 1/1966 | Olsson | 108—150 |
| 3,314,721 | 4/1967 | Smith | 297—445 |
| 3,363,956 | 1/1968 | Vingren et al. | 312—204 |

JAMES T. McCALL, Primary Examiner

U.S. Cl. X.R.

312—204, 254